W. P. DAVIS.
BELT FASTENER.
APPLICATION FILED MAR. 4, 1916.

1,229,903.

Patented June 12, 1917.

Witnesses
CJMaddox
JWGarner

Inventor
W. P. Davis.
By Victor J. Evans
Attorney

THE NORRIS PETERS CO., PHOTO-LITHO., WASHINGTON, D. C.

UNITED STATES PATENT OFFICE.

WILLIAM P. DAVIS, OF SALT LAKE CITY, UTAH.

BELT-FASTENER.

1,229,903. Specification of Letters Patent. Patented June 12, 1917.

Application filed March 4, 1916. Serial No. 82,136.

*To all whom it may concern:*

Be it known that I, WILLIAM P. DAVIS, a citizen of the United States, residing at Salt Lake City, in the county of Salt Lake and State of Utah, have invented new and useful Improvements in Belt-Fasteners, of which the following is a specification.

This invention relates to improvements in belt fasteners. One object of the invention is to provide a belt fastener which embodies a segmental plate provided with spaced weakening lines so that the plate may be cut of any length required to correspond with the width of a belt.

Another object is to provide an improved belt fastener which embodies a segmental plate to bear on the meeting ends of a belt and provided with openings for the reception of means for securing the belt ends to the concave side of the plate.

Another object of the invention is to provide an improved belt fastener which embodies a segmental plate of much less radius than the smallest pulley over which the belt passes and also embodies means for bending the belt ends out and causing them to bear against the concave side of the plate so that the belt ends and also the fastening means are prevented from coming in contact with the pulley as the belt fastener passes over the same.

The invention consists in the features of construction, combination, and arrangement of devices, hereinafter described and claimed.

In the accompanying drawings:—

For the purposes of this specification, a pulley is indicated at 1 and a belt at 2. In accordance with my invention I provide a fastener plate 3 for securing the ends of the belt together. This plate is segmental, presenting a concave inner side and a convex outer side. The fastener plate is provided at suitably spaced points with transverse weakening lines 4 which are here shown as formed by slots that terminate short of the sides of the plate. Thereby, the plate may be readily cut or broken at any point corresponding with one of the weakening lines to enable the plate to correspond in length with the width of the belt on which it is to be used. The plate is provided with openings 4' which are suitably spaced, and which are also on opposite sides of the weakening lines, the said openings being at a suitable distance from the opposite sides of the plate.

Figure 1:
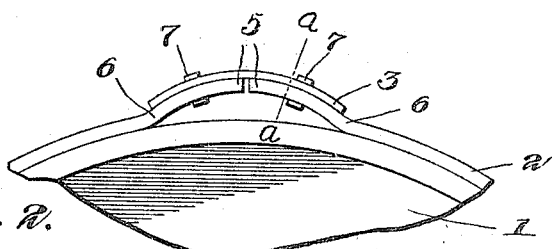
Figure 1 is an elevation of a belt fastener constructed and arranged in accordance with my invention, showing the same attached to and arranged on the outer sides of the ends of a belt, and also showing a portion of the pulley over which the belt passes.
Figure 2:
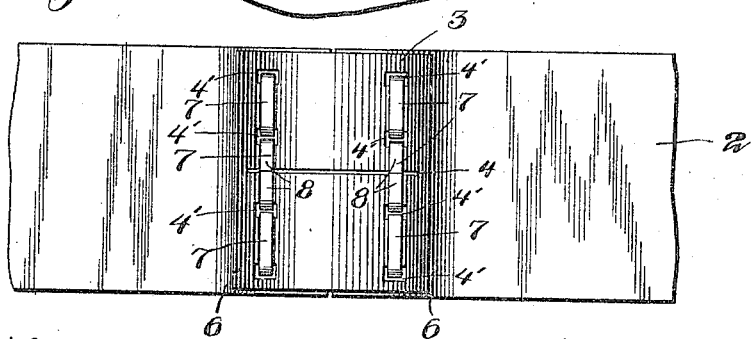
Fig. 2 is a plan of the same.
Figure 3:
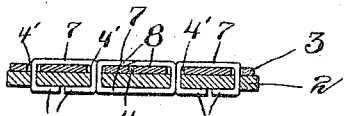
Fig. 3 is a sectional view of the same on the plane indicated by the line *a—a* of Fig. 1.

The ends 5 of the belt are out-turned, being bent at 6, at points corresponding with the sides of the plate and the bent ends of the belt bear against and conform to the curvature of the inner side of the plate. The ends of the belt are secured to the plate by staples 7 which pass through the openings 4' and also pass through openings near the ends of the belt. These staples have arms 8 which are broad in one dimension and relatively narrow in another dimension, the broken portions of the staple arms being arranged lengthwise of the belt and passing through longitudinally arranged openings in the belt so that the belt is only very slightly weakened by the openings therein. The staples are clenched and are arranged alternately in reverse relation as shown in Fig. 2, so that arms of two contiguous staples pass through each opening 4' in the plate and so that the bight or central portion of one staple is on the outer side of the plate while the corresponding portion of the next adjacent staple is on the inner side of the belt. The clenched ends of the staples overlap. Hence the staples serve to very securely fasten the belt ends to the plate. The radius of the plate is very much less than that of the smallest pulley over which the belt passes as indicated in Fig. 1 so that the out-turned ends of the belt are bowed outwardly from and together with the fastening staples, are entirely prevented from coming in contact with the pulley, as the fastened belt ends pass over the pulley. This prevents the fastening means from being worn and also prevents movement or working of the staples on the belt. Only those portions of the belt indicated at 6 and opposite the edges of the plate are bent by the passing of the fastener over the pulley and those portions of the belt are intact, are entirely unprovided with holes or other weakening devices, and hence the strength of the belt is not impaired.

Figure 4:
Figs. 4 and 5 are elevations showing modified constructions of the belt fastener.

In Fig. 4 of the drawing, I show a modified construction in which the staples are dispensed with and the plate 3ª is secured on the out-turned belt ends by means of wire lacings 9 which pass through the openings in the plate and openings in the belt and also pass across the joint between the ends of the belt.

Figure 5:
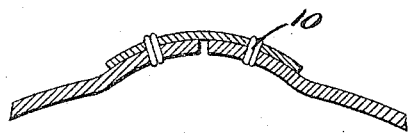

In Fig. 5 I show another modification in which double wire lacings 10 are employed which pass through the openings in the plate, openings in the belt, and are spaced from the meeting ends of the belt and are parallel therewith. In both these forms of the invention, as well as in the form shown in Fig. 1, the fastening devices which secure the plate on the belt ends are protected by the relatively slight radius of the segmental plate from coming into contact with the pulley.

Having described the invention, what is claimed is:

The combination of a plate having a weakening line and openings at opposite sides of said line, a belt on the meeting ends of which the plate is placed, and fastening means passing through the end portions of the belt and through the plate openings and extending across the weakening line of the plate and thereby reinforcing the plate.

In testimony whereof I affix my signature in presence of two witnesses.

WILLIAM P. DAVIS.

Witnesses:
   DAVID O. WILLEY, Jr.,
   HENRY WOLFE.

Copies of this patent may be obtained for five cents each, by addressing the "Commissioner of Patents, Washington, D. C."